US010355927B2

(12) United States Patent
Lihosit et al.

(10) Patent No.: US 10,355,927 B2
(45) Date of Patent: Jul. 16, 2019

(54) DEVICE MANAGEMENT SERVICE

(71) Applicant: T-Mobile USA, Inc., Bellevue, WA (US)

(72) Inventors: Christopher August Lihosit, Seattle, WA (US); Boua Lor, Tukwila, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 843 days.

(21) Appl. No.: 13/951,399

(22) Filed: Jul. 25, 2013

(65) Prior Publication Data

US 2015/0032867 A1    Jan. 29, 2015

(51) Int. Cl.
*H04L 12/24*    (2006.01)
*G06F 15/177*    (2006.01)

(52) U.S. Cl.
CPC .................... *H04L 41/082* (2013.01)

(58) Field of Classification Search
CPC ..................................................... H04L 41/082
USPC ......................................................... 709/221
See application file for complete search history.

(56) References Cited

U.S. PATENT DOCUMENTS

| 6,996,818 | B2* | 2/2006 | Jacobi | G06F 8/68 |
| | | | | 709/223 |
| 2004/0098421 | A1* | 5/2004 | Peng | G06F 8/61 |
| 2006/0106806 | A1* | 5/2006 | Sperling | G06F 8/65 |
| 2008/0231868 | A1* | 9/2008 | Onsen | G06F 3/1204 |
| | | | | 358/1.1 |
| 2009/0265687 | A1* | 10/2009 | Dhanakshirur | G06F 8/20 |
| | | | | 717/121 |
| 2012/0058744 | A1* | 3/2012 | Felt | H04M 3/382 |
| | | | | 455/414.1 |
| 2012/0110563 | A1* | 5/2012 | Ran | H04M 1/72525 |
| | | | | 717/170 |
| 2013/0219381 | A1* | 8/2013 | Lovitt | G06F 8/65 |
| | | | | 717/173 |

\* cited by examiner

*Primary Examiner* — Kevin T Bates
*Assistant Examiner* — Emad Siddiqi
(74) *Attorney, Agent, or Firm* — Lee & Hayes, P.C.

(57) ABSTRACT

The techniques described herein build a device and/or update a configuration of the device so that the device is tailored for a particular use or a particular user. That is, the techniques may receive device configuration update information and generate instructions to send to the device so that the device can execute the configuration update.

20 Claims, 5 Drawing Sheets

DEVICE MANAGEMENT SERVICE

BACKGROUND

Conventionally, service providers and/or original equipment manufacturers (OEMs) pre-load functionality (e.g., applications) and/or content items (e.g., movies, electronic books) on user equipment (e.g., mobile devices) to provide a value added service (VAS) to customers. The pre-loaded functionality and/or content items may also generate additional revenue for the service providers and/or the OEMs. For example, a service provider that provides cellular communications (e.g., voice and text) and data plans to subscribers may pre-load particular applications on mobile devices it services, such as a popular mobile radio application or a popular mobile television streaming application. In another example, the service provider may pre-load a newly released movie on mobile devices as an incentive to purchase a mobile device and/or subscription plan.

However, the existence of pre-loaded functionality and/or content on mobile devices also has set backs and may lead to customer dissatisfaction. For example, the pre-loaded functionality and/or content may consume a large amount of the available memory space (e.g., 30% of the total memory space) on an individual mobile device, and often this pre-loaded functionality and/or content cannot be removed. Thus, customers that do not use, on a regular basis, one of the pre-loaded applications may not want the pre-loaded application installed on their mobile devices due to the amount of memory space it consumes. Moreover, as capabilities of mobile devices continue to expand, pre-loaded functionality may diminish a degree to which a configuration of mobile device is tailored to or customized for a particular customer or a particular use.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
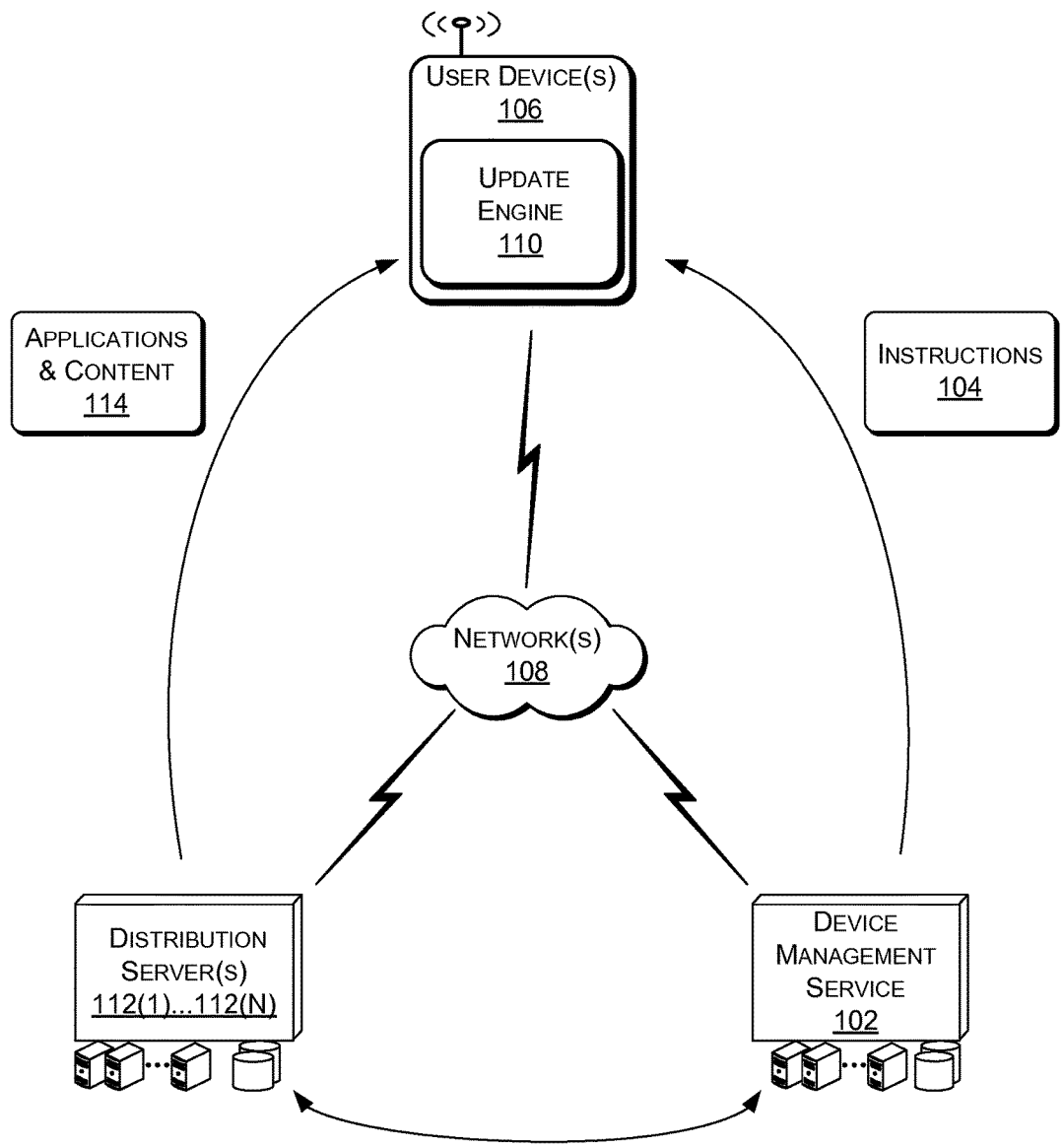
FIG. 1 depicts an example environment where instructions directed to a configuration update are sent to one or more user devices, in accordance with embodiments of the disclosure.

The techniques described herein build a device and/or update a configuration of the device so that the device is tailored for a particular use or a particular user. That is, the techniques may receive device configuration update information and generate instructions to send to the device so that the device can execute the configuration update.

The instructions define operations that identify functionality (e.g., applications, operating system updates, hardware features such as a camera or a sensor) or content (e.g., videos, images, ebooks, documents, etc.) associated with a configuration update. That is, the operations may enable functionality on a device, disable functionality on a device, install functionality on a device, uninstall functionality on a device, remove content items from a device, download content to a device, and so forth. The instructions may be mandatory instructions such that the instructions command a device to automatically, without user input, enable or disable functionality, install or uninstall functionality and/or remove or download content items. Or, the instructions may be optional such that the instructions allow users to provide input on whether or not to enable or disable functionality, install or uninstall functionality and/or remove or download content items. In some instances, individual update operations may be silent, such that the user of a device is not aware that the device has been or is being updated, while in other instances, individual update operations may be apparent to the user, such that the user of the device is informed of the configuration update.

Multiple different entities may have an interest in employing the techniques discussed herein. In a first example, a subscriber account may be associated with, or sponsored by, an enterprise entity (e.g., corporation, firm, government agency, university department, etc.) that provides devices to employees and agents and pays for the subscription (e.g., data plans, voice and text plans). The enterprise entity may designate and authorize a manager of the subscriber account (e.g., an information technology (IT) administrator, supervisor, etc.) to set configuration policies for the devices. Accordingly, the manager may provide configuration update information in accordance with the policies. For instance, a policy may permanently prohibit use of a popular non-work application (e.g., social network application) so the employees are more efficient and not distracted. A policy may temporarily restrict use of the popular non-work application for a defined period of time (e.g., during work hours, during a busy week with an imminent task deadline, etc.). Or, a policy may install and/or enable particular functionality (e.g., a new accounting work application) for a first group of employees (e.g., an accounting department) because their job tasks use and may depend on the particular functionality, but not install and/or disable the particular functionality for a second group of users (e.g., a public relations department) because their job tasks do not use and do not depend on the particular functionality. Therefore, the techniques described herein provide an efficient and automatic approach to dynamically configuring and updating a large number of devices sponsored by the enterprise entity so that the IT administrator does not have to spend the time and resources of manually configuring each device.

In a second example, a primary account holder (e.g., an individual customer, a parent on a family data plan) may be an entity that sets policies or provides configuration settings for one or more devices associated with a subscriber account. For instance, a policy or setting may indicate uninstalling pre-loaded applications on the device or removing pre-loaded content after the device has been purchased and activated. Thus, the device can be better customized for a particular user or a particular use. Or, a policy or setting may restrict particular applications for one or more devices associated with the subscriber account for a given period of time. For example, parents may restrict (e.g., disable, uninstall) use of gaming applications or social network applications for their kids' devices during week nights so they can focus on studying, but may permit their kids to use the gaming applications or social network applications on weekends when there is no school.

In a third example, a service provider that maintains the subscriber accounts or an OEM of the devices associated with the subscriber accounts may be an entity that provides configuration update information for devices. For instance, a service provider may want to uninstall or disable malicious applications (e.g., applications that present a security threat, chatty applications that consume large amounts of bandwidth, etc.). This example of a configuration update may apply to individual devices, individual subscriber accounts, or multiple different devices across multiple subscriber accounts. Or, the OEM of a particular type of device may want to distribute an operating system (OS) update to its devices.

In a fourth example, an application developer may be an entity interested in providing configuration update information for devices. For instance, the application developer may have an agreement or contract with the service provider to distribute a new application, or update a current application, on a group of devices. The application developer may target the group of devices based on one or more of a subscription plan type, a make and/or model of a device, age of device users, information indicative of common use of the device, user habits and preferences, etc. Accordingly, the application developer, in conjunction with the service provider, may provide information identifying the group of devices approved to receive the new application or updated application.

In some embodiments, the devices may receive and execute the instructions directed to updating the configuration prior to deployment or distribution to individual users of the device (e.g., the instructions may build the device and/or define an initial configuration). In other embodiments, the devices may dynamically receive and execute the instructions as part of a configuration update after the user has already received and is currently using the device. For instance, a service provider may send the instructions to a device for execution after receiving an indication that the device has initiated a first boot sequence or after the device requests (e.g., a pull notification) a configuration update (e.g., in accordance with a periodic check for a configuration update or receiving an indication of a re-boot). In some instances, the service provider may automatically push the instructions to the device for execution via an established network connection.

In various embodiments, the techniques allow a service provider and/or authorized user of a subscriber account to return a device to a previous configuration (e.g., a safe configuration) to address a security issue or a device bug that affects performance of the device without having to initiate a conventional factory reset in which the device loses the customized functionality and/or content items.

Therefore, the techniques described herein extend the viability of devices for longer periods of time by managing the configurations of the devices and ensuring that subscribers are satisfied with the configurations of their devices. As further discussed, a subscriber account may be associated with a single device (e.g., a single user is the primary account holder). Or, a subscriber account may be associated with multiple devices. For example, an enterprise entity may set up a subscriber account with a number of registered devices (e.g., five, ten, twenty, hundreds, thousands) that are individually distributed to employees or agents associated with the enterprise entity. In another example, a family may set up a subscriber account that includes individual devices for one or more parents (e.g., primary account holders) and one or more children (e.g., secondary account holders).

FIG. 1 depicts an illustrative environment 100 where a device management service 102 may generate and/or provide instructions 104 to one or more user device(s) 106. The device management service 102 may be part of a service provider entity or a telecommunications provider entity that implements network(s) 108 or uses network(s) 108 to communicate with user devices 106. Thus, the device management service 102 may include servers or other computing devices that support communications functionality for a large base of customers associated with user devices 106.

The user devices 106 may be referred to as user equipment (UE), and may include, but are not limited to, smart phones, mobile phones, cell phones, tablet computers, portable computers, laptop computer, personal digital assistants (PDAs), electronic book devices, handheld gaming units, personal media player devices, or any other electronic computing devices that may exchange voice and/or digital data over network(s) 108. The user devices 106 may individually include an update engine 110. The update engine 110 may be configured to monitor configuration information of the user device 106 and to communicate the configuration information of the user device 106 to the device management service 102. The update engine 110 may also be configured to manage execution of a configuration update based on the instructions 104 received from the device management service 102.

In various embodiments, the instructions 104 may include an explicit top-down order of individual operations for the update engine 110 to perform on the user device 106. The operations may instruct the update engine 110 to interact with the device management service 102 and/or distribution servers 112(1) . . . 112(N) to retrieve applications and content 114 or other configuration updates for the user device 106.

The distribution servers 112(1) . . . 112(N) may be owned and/or operated by the service provider operating the device management service 102 or other third-party providers associated with the service provider operating the device management service 102. For instance, the distribution servers 112(1) . . . 112(N) may be associated with entities that provide network streaming applications and multi-media content, network gaming applications and gaming content, social networking applications, mobile browsing applications and Web-based content, mobile radio applications and audio content, and the like.

The network(s) 108 may be configured as a mobile telephone network (MTN) that implements one or more of second, third, and fourth generation (2G, 3G, and 4G) cellular-wireless access technologies discussed above. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the network may implement Global System GSM, UMTS, and/or LTE/LTE Advanced telecommunications technologies. However, the network(s) 108 may also implement other networking technologies, such as a wide area network (WAN), metropolitan area network (MAN), local area network (LAN), neighborhood area network (NAN), personal area network (PAN), or the like.

Figure 2:
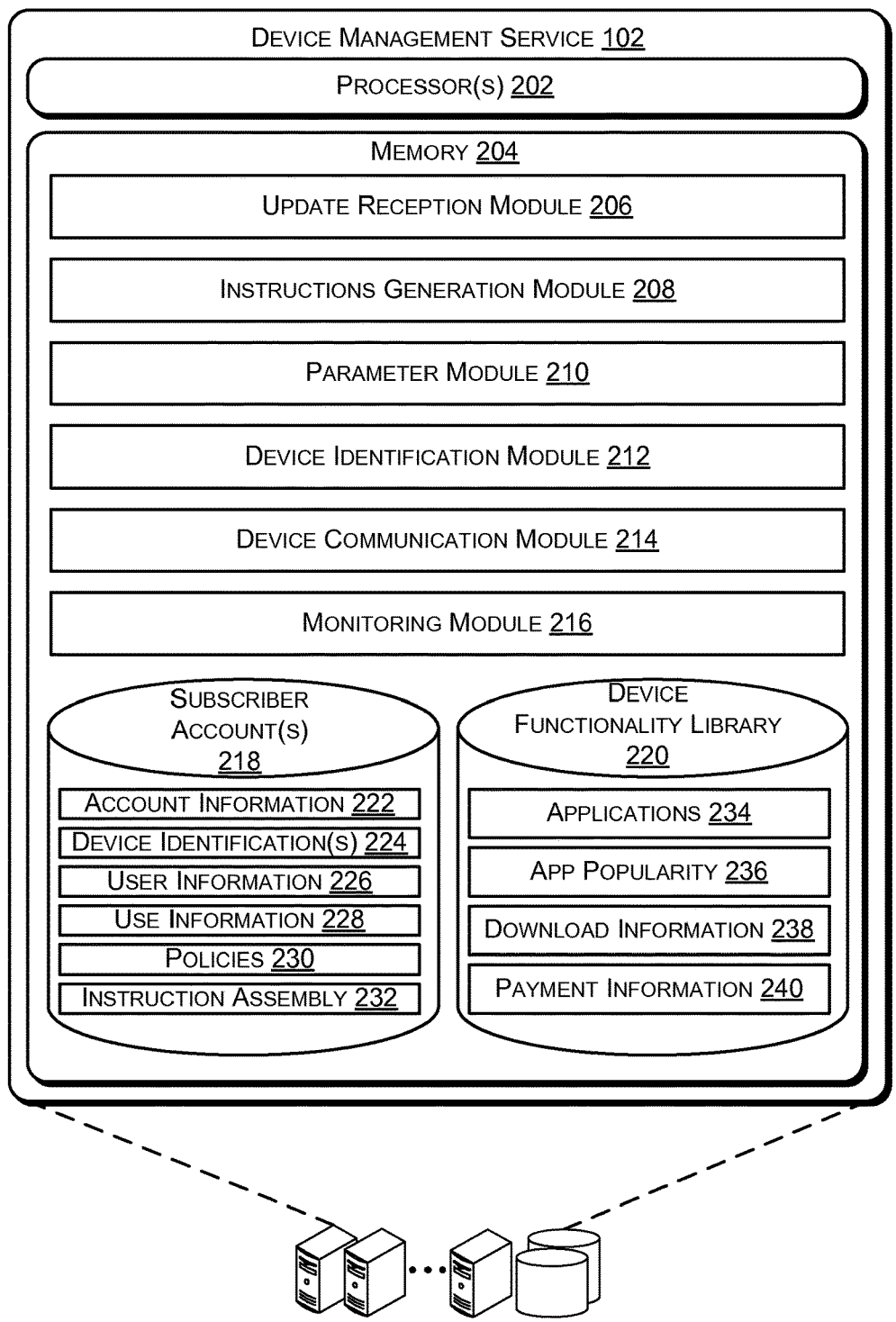
FIG. 2 illustrates example components of a device management service configured to receive information defining a configuration update and generate instructions to send to a user device to execute the configuration update, in accordance with embodiments of the disclosure.

FIG. 2 illustrates example components of the device management service 102. The device management service 102 may include one or more processor(s) 202 and a memory 204. In various embodiments, the memory 204 may store one or more of an update reception module 206, an instructions generation module 208, a parameter module 210, a device identification module 212, a device communication module 214, and/or a monitoring module 216, each of which is further discussed herein.

The memory 204 may also store information in a subscriber accounts 218 database and a device functionality library 220.

Each subscriber account in the subscriber accounts 218 database may include account information 222, device identification(s) 224, individual device user information 226, individual device use information 228, policies 230 and/or an instructions assembly 232 for individual devices associated with a subscriber account. The account information 222 may indicate a sponsor of the account (e.g., a primary account holder, an enterprise entity) and/or one or more users authorized to set policies 230 that provide a basis for a dynamic configuration update and generation of instructions to send to devices associated with the subscriber account. The account information 222 may also include general information such as a type of subscription plan, payment information (e.g., for subscription plan, fees for applications or mobile services used, etc.), and so forth.

The device identifications 224 may identify the devices associated with the subscriber account. For example, device identifications 224 may be based on a subscriber identity module (SIM) card or other device identification mechanisms. Moreover, the device identifications 224 may indicate a make and model of a device (e.g., the OEM company or brand), as well as specs (e.g., OS version) and capabilities of devices.

The user information 226 may include information about the individual users of the devices associated with the subscriber account. For instance, the user information 226 may indicate whether or not an individual user is authorized to update their own device or set a policy, an age of a user of a device (e.g., an age of child may be considered before distributing a Rated-R movie), an employment position or level of employment, demographic information, user interests and preferences or any other user information that may be valuable in considering whether a device is to receive a configuration update. The user information 226 may be provided by a primary account holder or the individual user when creating or updating a subscriber account or may be determined by the device management service 102 based on monitored uses of the devices.

The use information 228 may include functionality use of a particular device. That is, the monitoring module 216 may track or receive information with respect to which applications and/or features of a device are commonly used by the user (e.g., frequency of use of an application or a hardware feature including a number of instances functionality is activated/used or an amount of time functionality is activated/used).

The policies 230 may include information or descriptions that may be leveraged when creating the instructions 104. For example, a policy 230 may indicate that the new accounting application is a mandatory application install for employees in the accounting department. In another example, a policy 230 may indicate that any non-work applications (e.g., social networking applications, personal email, gaming applications) for a group of employees are prohibited for a defined period of time (e.g., a day, a week) to meet a task deadline.

In various embodiments, the instruction assembly 232 defines instruction operations that have previously been executed on individual devices. That is, the instruction assembly 232 maintains a historic or lifetime list of instructions for the device. The device management service 102 may leverage the instruction assembly 232 in scenarios where a user device 106 experiences a problem or security issue, and thus, the device management service 102 sends the instruction assembly 232 to return the user device to a safe configuration. Therefore, the device management service 102 may store each instance of instructions 104 provided to the user devices 106 in the instruction assembly 232.

Accordingly, the device management service 102 may leverage the account information 222, the device identifications 224, the user information 226, the use information 228, the policies 230 and/or the instruction assembly 232 to determine whether or not a device is a targeted or whether or not a device is a candidate device to receive instructions generated to implement a configuration update.

The device functionality library 220 may include information or metadata for applications 234 available to the user devices 106 supported by the device management service 102. The information may include application popularity 236 based on a number of installs/purchases and/or an amount of use for a large customer base, download information 238 indicating instructions for a user device 106 to download an application, and/or payment information 240 indicating costs associated with the application (e.g., no fee, one-time fee, periodic fee, application is a guaranteed application for devices of a particular make and model).

The availability of applications 234 may depend upon one or more of a subscription plan, make and/or model of a device, the user information 226 and so forth. The application popularity 236 may indicate a degree or level of popularity of individual applications 234. The degree or level of popularity may correspond to the general customer base, as tracked by the monitoring module 216.

In some embodiments, the information stored in the subscriber accounts 218 database and a device functionality library 220 may be maintained on, or made available to, the distribution servers 112(1) . . . 112(N).

Each of the one or more processor(s) 202, may include one or more central processing units (CPUs) having one or multiple arithmetic logic units (ALUs) that perform arithmetic and logical operations, as well as one or more control units (CUs) that extract instructions and stored content from processor cache-level memory, and then execute instructions by calling on the ALUs during program execution.

The memory 204 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

As discussed above, the device management service 102 may provide a platform for an entity to initially build and configure customized devices for users associated with a subscriber account. The device management service 102 may also allow the entity to dynamically update configurations of the devices. Accordingly, the update reception module 206 may be configured to receive settings and/or policies from an entity or authorized person (e.g., primary account holder such as parent, designated manager of account such as an IT administrator, an agent for the service provider to disable/uninstall malicious or discontinued applications, agent of an OEM to distribute an OS update) to configure the devices associated with one or more of the subscriber accounts. In various embodiments, the authorized entity may be defined in the account information 222 and/or approved by the service provider operating the device management service 102.

Therefore, the update reception module 206 may receive information (e.g., settings or policies) that defines an update configuration for one or more user devices 106. The information received may explicitly indicate which user devices 106 receive the configuration updates or may provide a description of which user devices 106 are to receive the configuration update. The user devices 106 to receive the configuration updates may be associated with an individual subscriber account or may be distributed across multiple subscriber accounts. For example, a policy defined by an account holder may list one or more users or individual devices associated with the subscriber account to receive the configuration update. A configuration update defined by the service provider or an OEM may list a device make and model to determine which devices receive the configuration update or may define one or more pieces of user or payment information to determine if an associated device is to receive the configuration update.

In various embodiments, the instructions generation module 208 generates a set of instructions to send to the user devices 106 based on the information received by the update reception module 206 (e.g., policies and settings). The set of instructions may include a top-down list of operations for a user device 106 to execute to perform the configuration update.

A first example operation included in the instruction set may include an enable operation. In various embodiments, the enable operation may command the user device 106 to enable a mandatory application or a mandatory hardware feature (e.g., a camera or a sensor). In other embodiments, the enable operation may include an indication that a user associated with the user device 106 is allowed or permitted to enable the application or the hardware feature.

A second example operation included in the instruction set may include a disable operation. In various embodiments, the disable operation may command the user device 106 to disable an application or device hardware feature so they are not available for use on the user device 106 (e.g., the camera or the sensor that cannot be removed from the user device 106). In other embodiments, the disable operation may include an indication that a user associated with the user device 106 is allowed or permitted to disable the application or the hardware feature.

The enable instruction and/or disable instruction provide an ability to restrict use of an application or device service element without completely uninstalling or removing it. The enable instruction and/or disable instruction may be advantageous in scenarios where use is restricted for a defined time period. For example, a service provider may no longer provide an application as part of a free VAS (e.g., after an introductory period), and thus, may disable the application upon expiration of the introductory period until the user agrees to pay for the application and sets-up a payment plan to use the application (e.g., one-time payment, periodic payment, etc.). In another example, an agreement between a service provider and a third-party provider of an application may expire, and the service provider may want to disable the application until a new agreement is reached with the third-party provider to provide the application to a large customer base.

In some instances, the disable operation may be supplemented with an additional authorization or security layer configured to make functionality available to a user device and a user if an approved code or password is entered. For example, a disable operation that is part of the instructions may indicate that a particular application be disabled on a user device for a defined period of time (e.g., work hours or 9:00 am to 5:00 pm on Mon, Tues, Wed, Thurs, Fri). However, the entity setting the policy or providing the configuration update settings may also issue a code or password to select devices that, when properly entered and authorized after activation of the particular application, allows temporary use of the particular application (e.g., one-time use, for a defined time period, etc.). The code or password may be unique to an individual user device such that it cannot be used on other devices (e.g., cannot be shared). Or, the code or password may be a group code or password shared across multiple devices for multiple users. Similarly, the code or password may be unique to a single application, content item or hardware features on a device. Or, the code or password may be used for a particular set of instructions or configuration update that affects multiple different types of functionality (e.g., the code or password may apply to multiple applications, content items, and/or hardware features on a device).

A third example operation included in the instruction set may include an install operation. In various embodiments, the install operation may command the user device 106 to install a mandatory application. In other embodiments, the install operation may include an indication that a user associated with the user device 106 is allowed or permitted to install an allowed or approved application. As an example, the install operation may be advantageous in situations where an employee needs a particular application to perform a job task. Thus, once the particular application is ready for deployment, the install operation can be leveraged to install the particular application on employee devices that may need the application to perform the job task.

A fourth example operation included in the instruction set may include an uninstall operation. In various embodiments, the uninstall operation may command the user device 106 to uninstall an application. In other embodiments, the uninstall operation may include an indication that a user associated with the user device 106 is allowed or permitted to uninstall an application (e.g., the application is not a mandatory application and the user can uninstall it to free up memory space). As an example, the uninstall application may be advantageous in situations where an enterprise entity or a primary account holder (e.g., parent) wants to prohibit use of a distracting application (e.g., a social networking application that hinders work or studying). As another example, the uninstall application may be advantageous in situations where a service provider may want to uninstall a "chatty" application that consumes a large amount of communication bandwidth even when the user is not actively using the application or an application that presents a security threat to the user devices 106 or the service provider.

A fifth example operation included in the instruction set may include a download operation. In various embodiments, the download operation may command the user device 106 to download a content item (e.g., a work video that an enterprise entity distributes to its employees for viewing). In other embodiments, the download operation may include an indication that a user associated with the user device 106 is allowed or permitted to download a content item (e.g., a newly released movie or an ebook).

A sixth example operation included in the instruction set may include a remove operation. In various embodiments, the remove operation may command the user device 106 to remove a content item (e.g., a movie the user has already watched that was pre-loaded on the user device). In other embodiments, the download operation may include an indication that a user associated with the user device 106 is allowed or permitted to remove a content item.

A seventh example operation included in the instruction set may include a report operation. In various embodiments, the report operation is provided to the user device 106 and in response to the report operation, the update engine 110 of the user device 106 sends a current configuration of the user device 106. The current configuration may indicate a current disposition of the user device 106, including functionality currently maintained on the device and information associated with the use of the functionality (e.g., memory space used, network bandwidth used, frequency of use by the user, etc.). The device management service 102 may then use the current configuration reported by the user device 106 to determine if the user device 106 is configured in accordance with policies 230 or other settings. If there is a discrepancy, the instructions generation module 208 may fetch the instruction assembly 232 that defines instruction operations previously performed and sends the instructions to the use device 106 so that the user device 106 can return to a previous configuration. The report operation is advantageous when a user device 106 experiences configuration problems (e.g., problem applications, a virus, a bug, etc.) and wants to return to a most recent configuration that does not include the source of the configuration problems (e.g., a most recent safe configuration). Instead of doing a complete factory reset to an initial configuration and then having to manually install all the user customized functionality, the instructions generation module 208 may generate an instruction set based on the instruction assembly 232 which may define a most recent configuration that does not include the problem applications. In some instances, the order of the instruction operations may be based on a priority assigned to different functionality (e.g., an install instruction for a work application may have a higher priority than a gaming application or a movie content item).

The example instruction operations provided above are not an exhaustive list of operations that may be included in an instruction set. That is, there may be other instruction operations generated by the device management service 102 to efficiently build, update, manage and/or customize user devices 106 for a particular user or a particular use. For instance, an entity may use the device management service 102 to configure a boot animation on user device 106. That is, the device management service 102 may send an instruction operation to download and display a customized graphic (e.g., different than a default or pre-installed boot graphic) that is service provider agnostic or that is representative of an enterprise logo, brand or emblem. In another embodiment, an entity may use the device management service 102 to ensure that users of use devices 106 are provided with a display notification (e.g. a warning) when accessing and downloading an application or content item from an unapproved or unauthorized third-party provider (e.g., functionality that is not part of a service provider marketplace or that is not known to the device functionality library 220).

In various embodiments, the parameter module 210 defines parameters associated with execution of the instructions on the user device 106. For example, the parameters may include network information that defines network settings (e.g., Wi-Fi connection preferred, Wi-Fi connection required, strength of signal required, etc.) to initiate at least a portion of a configuration update (e.g., download a particular video, install a particular application, etc.). The parameter module 210 may leverage the download information 238 and other application information in the device functionality library 220 when defining the parameters relating to networking information.

In some embodiments, the parameters may include progress information that defines whether or not to present progress indicators associated with a portion of the configuration update to a user of a user device 106. The parameter module 210 may indicate to display progress indicators so users are aware of an instruction operation (e.g., install of an application or download of a content item). The parameter module 210 may indicate not to display progress indicators for an instruction operation that is automatically enforced on the user device 106.

In some embodiments, the parameters may include notification information that defines whether or not to present pre-update notifications or post-update notifications associated with a portion of the configuration update to a user of the device. The pre-update notifications or the post-update notifications may be presented on the user devices 106 in situations where it is beneficial for the device management service 102 to inform a user of the user device 106 of a configuration update. The pre-update notifications or the post-update notifications may not be presented on the user devices 106 in situations where the device management service 102 does not want to inform a user of the user device 106 of a configuration update.

In some embodiments, the parameters may include timing information that defines a time to initiate a portion of the configuration update. For example, the timing information may be associated with an approved time period for the functionality use (e.g., as defined by a policy 230), an urgency or priority associated with a portion of the configuration update, and so forth.

In some embodiments, the parameters may include option information defining whether a user associated with a device has an option to accept or block a portion of the configuration update. That is, the user may be allowed to install an application that is approved, but the user may not want the application installed on their device. Or, the installation of the application may be mandatory and thus, the user may not have an option to not install the application.

The parameters listed above are example parameters and not an exhaustive list. Thus, any parameters that define how, when and/or where to initiate a portion of the instructions (e.g., download content, install an application) are contemplated in the context of this document.

In various embodiments, the device identification module 212 is configured to determine which user devices 106 are to receive a configuration update. For example, the device identification module 212 may map configuration update information received by the update reception module 206 to the device identifications 224 and/or user information 226 in the subscriber accounts to determine which devices are to receive the instructions generated in accordance with a configuration update. In some instances, the information received by the update reception module 106 may explicitly list devices to receive the configuration updates (e.g., an IT administrator lists the device identifications). In other embodiments, the device identification module 212 may correlate the information received by the update reception module 106 to device identifications 224 in one or more subscriber accounts (e.g., map a user name to a device identification, map an employment level of a policy to a device identification, map an OS update to a device make and model associated with a device identification, etc.).

In various embodiments, the device communication module 214 sends the instructions and/or the parameters to the user devices 106. For example, the device communication module 214 may send the instructions and/or parameters to the user device 106 after an initial or first boot of the user device 106. Or, the device communication module 214 may send the instructions and/or parameters to the user device 106 after a subsequent re-boot or periodic check-in with the device management service 102 (e.g., hourly check-in, daily check-in, weekly check-in, and so forth).

In various embodiments, the monitoring module 216 is configured to monitor the use of functionality (e.g., frequency of use, amount of time of use) on individual user devices 106 and store the information in the use information 228. Accordingly, the device management service 102 may leverage the use information 228 to ensure that a user device 106 is a best possible device for a particular user. That is, the instructions generation module 208 may generate an instruction to uninstall a never used application or uninstall an application whose use does not satisfy a threshold frequency of use (e.g., a threshold number of uses in a defined time period such as at least one use per month). This may free up memory space on the user device 106 and increase processing speed of the user device 106.

In some embodiments, the monitoring module 216 may also aggregate the use information across multiple devices and multiple subscriber accounts and store the aggregated use information as application popularity 238 in the device functionality library 220.

In various embodiments, the monitoring module 216 may also receive and monitor the configuration information of the user devices 106 in association with the report operation discussed above. The configuration information may be evaluated to determine whether or not a user device 106 is to receive a configuration update (e.g., an OS update).

In various embodiments, the information gathered by the monitoring module 216 and stored in the use information 228 may be leveraged by the device management service 102 and/or the service provider during a time when a user is upgrading a device and/or a subscription plan. For example, the use information 228 may reveal that a user captures and uploads a large amount of photographs or the user spends a vast amount of time playing games. Thus, the device management service 102 and/or the service provider may suggest, during a period of user upgrade, a customized recommendation of a user device with a high quality camera to take photographs or a user device with a large screen size to support gaming applications.

Figure 3:
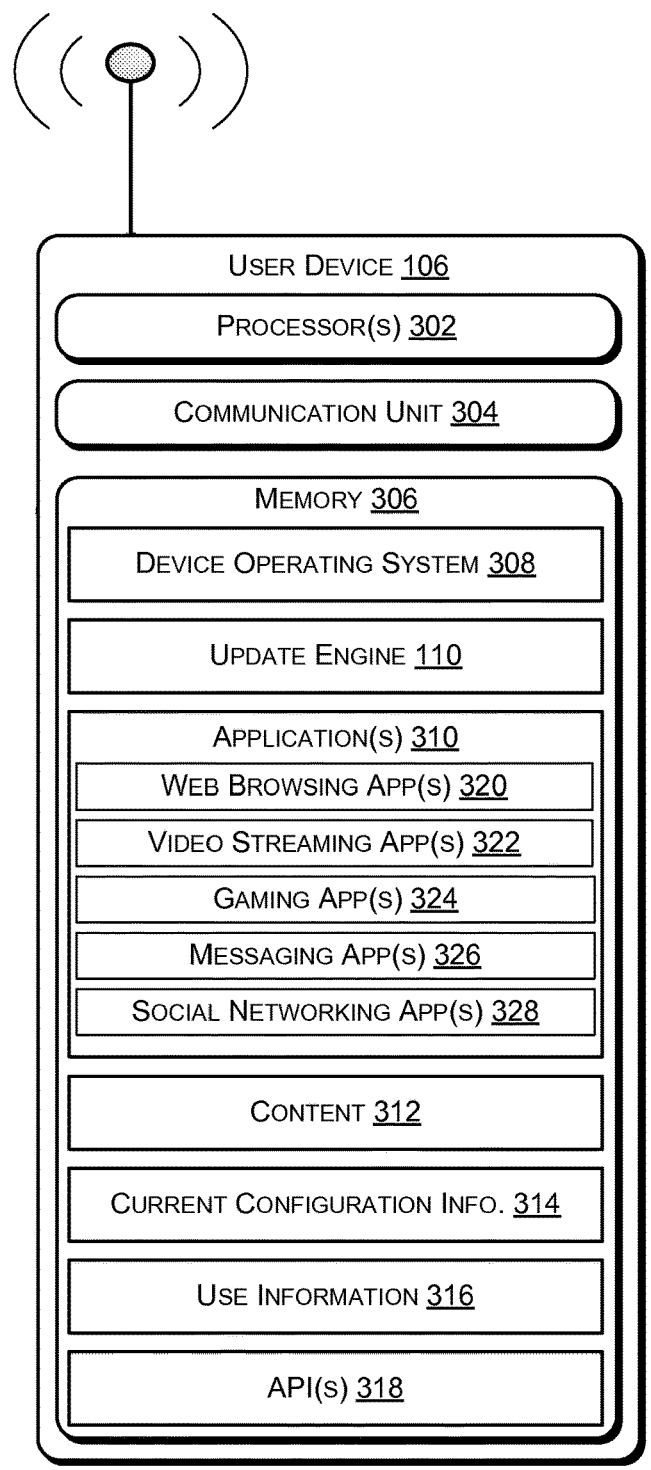
FIG. 3 illustrates example components of a user device configured to receive instruction and execute a configuration update, in accordance with embodiments of the disclosure.

FIG. 3 illustrates example components of a user device 106, which is configured to wirelessly receive the instructions 104 (e.g., a set of top-down instruction operations) from the device management service 102 to implement a configuration update. Thus, the user device 106 may include one or more processor(s) 302, a communication unit 304 for wirelessly communicating via the network(s) 108, and a memory 306 storing a device operating system (OS) 308, the update engine 110, various software applications 310, various content 312 items, current configuration 314 information, use information 316 and one or more application programming interface(s) 318.

The processor(s) 302 and memory 306 on user device 106 may be implemented in accordance with one of the examples provided above with respect to processor(s) 202 and memory 204. The device OS 308 is configured to manage services and device functionality for the benefit of other modules and components (e.g., applications 310).

The applications 310 (also referred to as "apps") may include, but are not limited to, web browsing application(s) 320, video streaming application(s) 322, gaming application(s) 324, messaging application(s) 326 (e.g., email apps), social media application(s) 328 or any other applications that may exchange data over the network(s) 108.

In various embodiments, the update engine 110 is configured to receive the instructions 104 from the device management service 102 and execute the individual operations in the instructions 104. For example, the instructions 104 may describe how the update engine 110 is to interact with the distribution servers 112(1) . . . 112(N) and/or the device management service 102 to install functionality (e.g., an identified application) or download a content item. In another example, the instructions 104 may indicate to enable, disable, uninstall or remove functionality or content items already maintained on the memory 306 of the user device 106. Accordingly, the update engine 110 may be a persistent service that runs in the background and that is configured to check-in (e.g., upon boot or re-boot, in accordance with a periodic schedule, upon user request) with the device management service 102 to see if there is a configuration update available for the user device 106. The update engine 110 then receives the instructions 104 if a configuration update is available and executes the operations in the instructions by identifying functionality subject to an operation and leveraging one of the APIs 318 to execute the operation (e.g., install an application, enable a hardware feature such as a camera, etc.). In some instances, the update engine 110 may be part of the device operating system 308.

Figure 4:
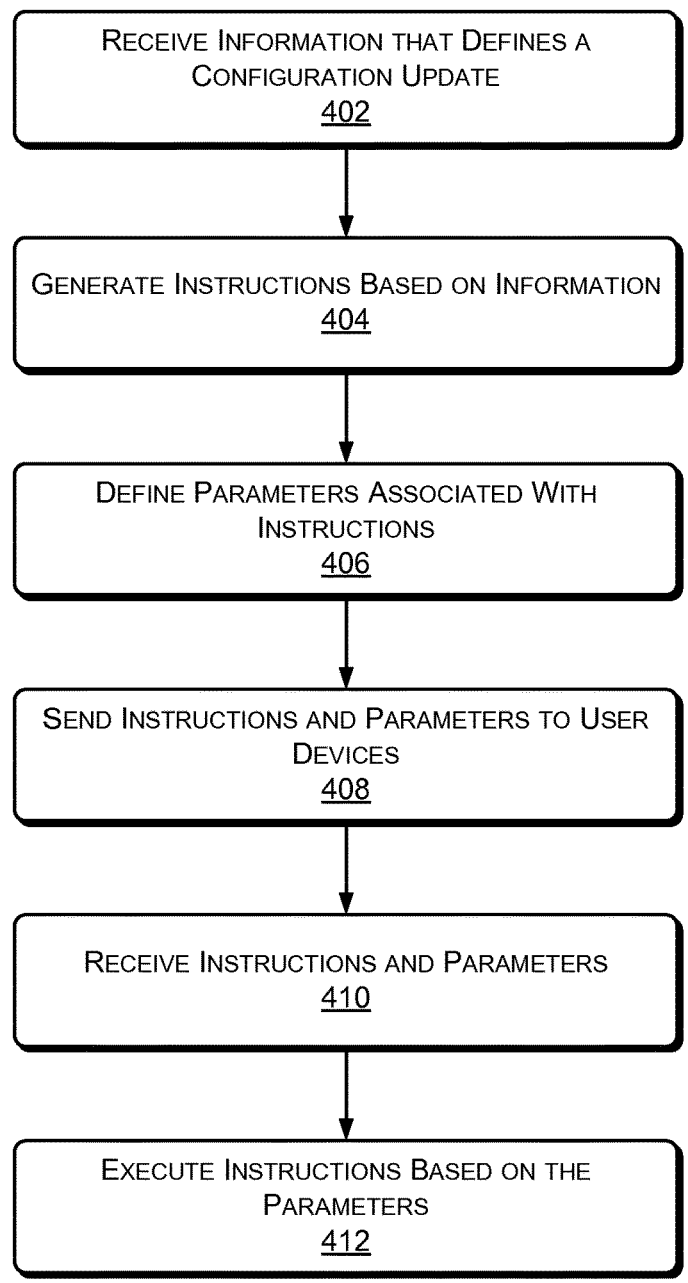
FIG. 4 illustrates an example process for generating, sending and/or executing instructions to implement a configuration update.
Figure 5:
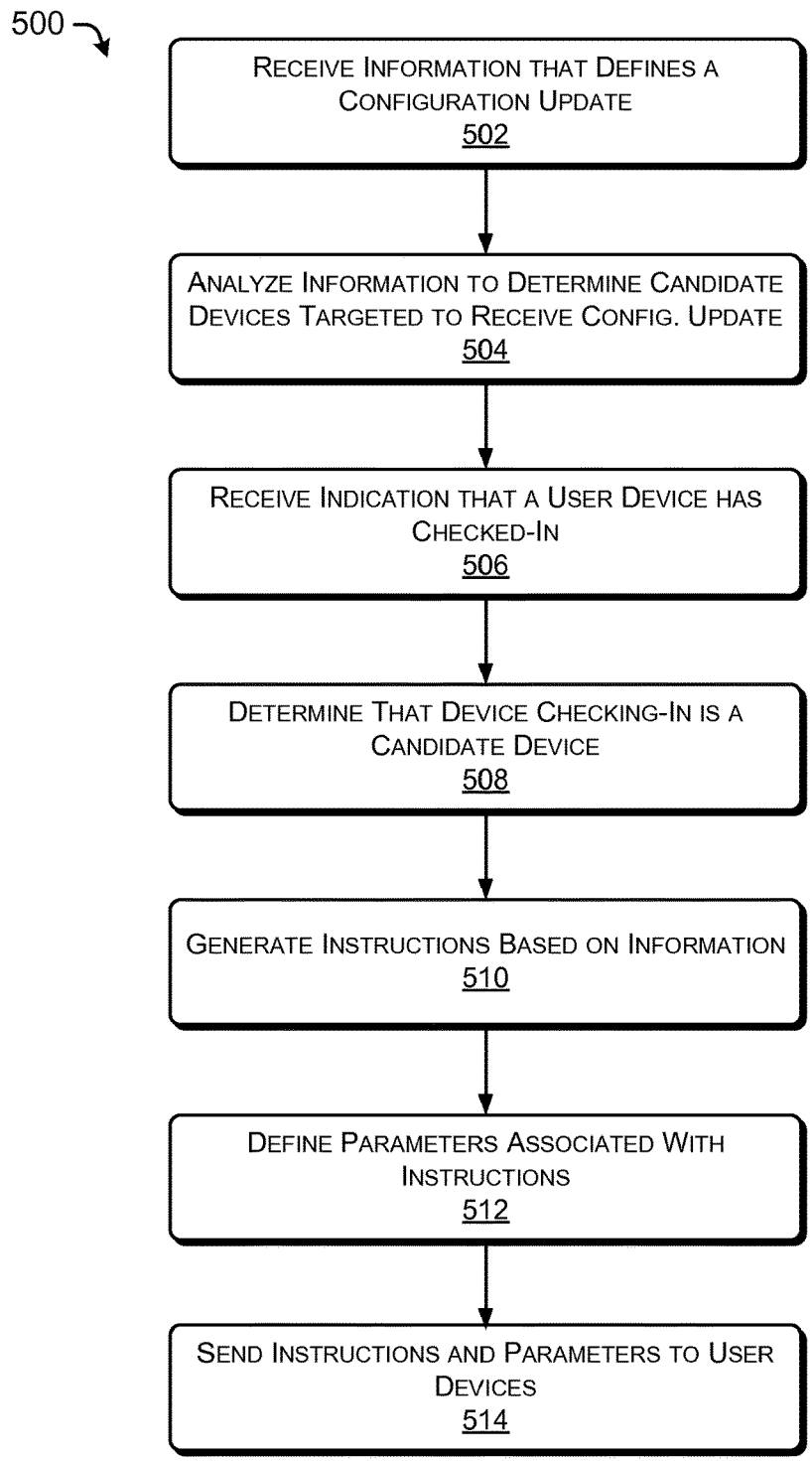
FIG. 5 illustrates another example process for generating, sending and/or executing instructions to implement a configuration update.

FIGS. 4 and 5 illustrate example processes for distributing configuration updates to user devices. Each process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the example processes in FIGS. 4 and 5 may be described with reference to FIGS. 1-3.

FIG. 4 shows a flow diagram of an example process 400 for generating, sending and/or executing instructions.

At block 402, the update reception module 206 receives information that defines a configuration update for one or more user devices 106. In a first example, the information may be provided by a manager of a subscriber account associated with an enterprise entity that provides devices to employees and agents. Accordingly, the manager may provide configuration update information in accordance with the policies. For instance, a policy may permanently prohibit or temporarily restrict use of a popular non-work application or a hardware feature of the user device 106.

In a second example, the information may be provided by a primary account holder that defines settings for one or more user devices 206 associated with a subscriber account. For instance, a setting may indicate uninstalling pre-loaded applications on a user device 106 after the user device 106 has been purchased and activated or restricting use of a particular application on a user device 106.

In a third example, the information may be provided by a service provider that maintains the subscriber accounts or an OEM of the user devices 106 associated with the subscriber accounts. For instance, a service provider may want to uninstall or disable malicious applications (e.g., applications that present a security threat, chatty applications that consume large amounts of bandwidth, etc.). The service provider may leverage information in the subscriber accounts 218 and/or the device functionality library 220 when determining to update a configuration of a user device 106.

In a fourth example, the information may be provided by an application developer. For instance, the application developer may have an agreement or contract with the service provider to distribute a new application, or update a current application, on a group of devices. The application developer may select the group of devices and/or target the group of devices based on one or more of a subscription plan type, a make and/or model of a device, age of a user of a device, information indicative of common use or user habits, etc.

At block 404, the instructions generation module 208 generates instructions 104 based on the information received by the update reception module 206. The instructions 104 may include a top-down list of operations the user device 106 follows to implement the configuration update. As discussed above, the instructions 104 may include one or more of an enable operation, a disable operation, an install operation, an uninstall operation, a remove operation, a download operation and/or a report operation.

At block 406, the parameter module 210 may define one or more parameters associated with each individual operation in the instructions 104. For example, the parameters may define a network connection to install an application or whether or not to display an update notification on the user device.

At block 408, the device communication module 214 sends the instructions 104 and/or the parameters to one or more user devices 106 configured to receive the configuration update.

At block 410, an update engine 110 of each of the one or more user devices 106 receives the instructions 104 and/or parameters. At block 412, the update engine initiates and/or completes execution of the individual operations included in the instructions. That is, the one or more devices 106 may execute individual operations based on the parameters.

FIG. 5 shows a flow diagram of another example process 500 for generating, sending and/or executing instructions.

At block 502, the update reception module 206 receives information that defines a configuration update for one or more user devices 106. The information may include configuration policies or setting and a list or description of devices to receive the configuration update.

At block 504, the device identification module 212 analyzes the information to determine one or more candidate devices targeted to receive the configuration update. In various embodiments, the device identification module 212 may identify a specific subscriber account associated with an entity that provides the information. The device identification module 212 may then map the configuration update to the device identifications 224 associated with the devices targeted to receive the configuration update. For example, the device identification module 212 may determine that the configuration update is a policy 230 that targets user devices in a particular work department, and the device identification module 212 may determine the devices for users within the particular work department by leveraging the device identifications 224 and/or the user information 226.

In various embodiments, the device identification module 212 may determine that the configuration update targets devices from different subscriber accounts, and thus, the device identification module 212 may leverage information in multiple subscriber accounts to identify the devices to receive the configuration update. For example, a service provider may provide information regarding a configuration update directed to uninstalling a pre-loaded application (e.g., a virus scan application) from particular devices that have not registered to pay for the pre-loaded application or are not part of subscription plan that includes the pre-loaded application for free. Accordingly, the device identification module 212 may access account information 222 to determine if the subscriber account 218 has paid (e.g., re-occurring monthly payment, one-time payment) for the pre-loaded application or is part of a subscription plan that includes the pre-loaded application. The device identification module 212 may then identify devices from which to uninstall or disable the pre-loaded application. Or, the device identification module 212 may then identify devices on which to install an updated version of the pre-loaded application.

In another example, the device identification module 212 may leverage the account information 222 and/or the user information 226 to determine devices qualified to receive to a configuration update but have not yet received the configuration update. For example, users of devices may have an associated registered identification to access email services and/or application stores hosted by the OEM of a device or a manufacturer of the device OS 308. The users with a registered identification may be configured to receive, separate from the techniques described herein (e.g. independent of the device management service 102), OS updates automatically as they are released by the OEM or manufacturer of the device OS. The users that do not have a registered identification may not receive the configuration update. Accordingly, the device identification module 212 may access the account information 222 and/or the user information 226 to determine whether users of the devices have a registered identification, and if not, the device identification module 212 selects them as a candidate device to receive the configuration update.

At block 506, the device management service 102 receives an indication that a user device 106 has checked-in to determine if a configuration update is available. The check-in may occur after an initial boot commences, a re-boot commences, or on a periodic basis (e.g., daily, weekly, etc.).

At block 508, the device identification module 212 determines that the device checking-in is a candidate device to receive the configuration update. For example, the device identification module 212 may determine if the SIM of the device checking-in matches a SIM of a user device 106 targeted to receive the configuration update.

At block 510, the instructions generation module 208 generates instructions 104 based on the information received by the update reception module 206.

At block 512, the parameter module 210 may define one or more parameters associated with each individual operation in the instructions 104.

At block 514, the device communication module 214 sends the instructions 104 and/or the parameters to one or more user devices 106 configured to receive the configuration update.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from an entity authorized to define a configuration update for a plurality of user devices, information that defines the configuration update for a user device of the plurality of user devices, the configuration update including removing at least one pre-installed application or pre-loaded content item and adding at least one other application or other content item;
generating, by one or more processors and based in part on the information, instructions consumable by the user device to achieve the configuration update;
generating, by one or more processors and based in part on the information, one or more parameters associated with execution of the instructions on the user device, the one or more parameters including timing information defining a time to initiate at least a portion of the configuration update;
receiving an indication that the user device has initiated a boot sequence or requested the configuration update; and
sending, to the user device, the instructions and the one or more parameters to initiate the configuration update or to complete the configuration update,
wherein the entity is a primary account holder of a subscriber account and the user devices are respectively associated with one or more secondary users of the subscriber account, the primary account holder providing the information defining the configuration update, and
wherein the configuration update includes removing the at least one pre-installed application or the pre-loaded content item from the user device while retaining it on another of the user devices.

2. The method of claim 1, wherein the configuration update disables functionality of the user device and the instructions command the user device to disable the functionality.

3. The method of claim 1, wherein the configuration update enables functionality of the user device and the instructions allow the user device to enable the functionality.

4. The method of claim 1, wherein the configuration update indicates at least one prohibited application maintained on the user device and the instructions command the user device to uninstall the at least one prohibited application.

5. The method of claim 1, wherein the configuration update indicates at least one allowed application for the user device and the instructions permit the user device to install the at least one allowed application on the user device.

6. The method of claim 1, wherein the configuration update indicates removing a content item maintained on the user device and the instructions command the user device to remove the content item.

7. The method of claim 1, wherein the configuration update indicates downloading a content item to the user device and the instructions permit the user device to download the content item to the user device.

8. The method of claim 1, wherein the one or more parameters further include at least one of:
network information defining network settings to initiate at least a portion of the configuration update;
progress information defining whether to display progress indicators associated with at least a portion of the configuration update;
notification information defining whether to display pre-update notifications or post-update notifications associated with at least a portion of the configuration update; or
option information defining whether a user associated with the user device has an option to accept or block at least a portion of the configuration update.

9. The method of claim 1, wherein the timing information includes an approved time period for a functionality of the at least one pre-installed application or the pre-loaded content item.

10. The method of claim 1, wherein the timing information is based, at least in part, on an urgency or priority associated with at least a portion of the configuration update.

11. One or more non-transitory device memories storing computer-executable instructions that, when executed by one or more processors, perform operations comprising:
generating instructions to implement, based on a policy, a configuration update of a plurality of devices that have a subscription with a service provider, the policy specifying removing at least one pre-installed application or pre-loaded content item from a device of the plurality of devices and adding at least one other application or other content item to the device of the plurality of devices as at least a part of the configuration update;
generating one or more parameters associated with the configuration update, the one or more parameters including timing information defining a time to initiate at least a portion of the configuration update;
identifying the device as one of the devices to receive the instructions to implement the configuration update; and
sending the instructions and the one or more parameters to the device to enable the device to initiate the configuration update or to complete the configuration update,
wherein the policy is defined by a subscriber account and the devices are respectively associated with one or more secondary users of the subscriber account, a primary account holder providing information defining the policy, and
wherein the configuration update includes removing the at least one pre-installed application or the pre-loaded content item from the device while retaining it on another of the plurality of devices.

12. The one or more non-transitory device memories of claim 11, wherein the operations further comprise:
   maintaining an instruction assembly indicating previous configuration instructions for the device of the plurality of devices;
   sending, to the device of the plurality of devices, a request to provide information relating to a current configuration of the device of the plurality of devices;
   receiving, from the device of the plurality of devices, the information relating to the current configuration of the device of the plurality of devices;
   determining that the current configuration of the device of the plurality of devices is inconsistent with the instruction assembly for the device of the plurality of devices; and
   generating the instructions to implement the configuration update based in part on the instruction assembly.

13. The one or more non-transitory device memories of claim 11, wherein the operations further comprise:
   monitoring a frequency of use of functionality installed on the devices; and
   generating the instructions based in part on the frequency of use.

14. The one or more non-transitory device memories of claim 13, wherein the instructions command the devices to uninstall or disable an application that has a frequency of use that is less than a frequency use threshold.

15. The one or more non-transitory device memories of claim 11, wherein the instructions comprise one or more of:
   a command for the devices to disable functionality;
   an indication that allows the devices to enable functionality;
   a command for the devices to uninstall functionality;
   an indication that allows the devices to install functionality;
   a command for the devices to remove content; or
   an indication that allows the devices to download content.

16. The one or more non-transitory device memories of claim 11, wherein the one or more parameters further include at least one of:
   network information defining network settings to initiate at least a portion of the configuration update;
   progress information defining whether to display progress indicators associated with at least a portion of the configuration update;
   notification information defining whether to display pre-update notifications or post-update notifications associated with at least a portion of the configuration update; or
   option information defining whether a user associated with a device has an option to accept or block at least a portion of the configuration update.

17. A system comprising:
   one or more processors;
   one or more memories;
   an update reception module, maintained on the one or more memories and operable by the one or more processors, to receive a policy that defines a configuration update, the configuration update including removing at least one pre-installed application or pre-loaded content item and adding at least one other application or other content item;
   an instructions generation module, maintained on the one or more memories and operable by the one or more processors, to generate instructions to implement, based on the policy, the configuration update;
   a parameter module, maintained on the one or more memories and operable by the one or more processors, to generate one or more parameters associated with execution of the instructions, the one or more parameters including timing information defining a time to initiate at least a portion of the configuration update;
   a device identification module, maintained on the one or more memories and operable by the one or more processors, to analyze the policy to identify a plurality of devices as candidate devices to receive the configuration update; and
   a device communication module, maintained on the one or more memories and operable by the one or more processors, to send the configuration update and the at least one of the one or more parameters associated with execution of the instructions to the plurality of devices in response to individual ones of the plurality of devices checking-in to determine if the configuration update is available,
   wherein the policy is defined by and received from a primary account holder of a subscriber account and the devices are respectively associated with one or more secondary users of the subscriber account, and
   wherein the configuration update includes removing the at least one pre-installed application or the pre-loaded content item from one of the devices while retaining it on another of the devices.

18. The system of claim 17, wherein the one or more parameters further include at least one of:
   network information defining network settings to initiate at least a portion of the configuration update;
   progress information defining whether to display progress indicators associated with at least a portion of the configuration update;
   notification information defining whether to display pre-update notifications or post-update notifications associated with at least a portion of the configuration update; or
   option information defining whether a user associated with a device has an option to accept or block at least a portion of the configuration update.

19. The system of claim 17, wherein the timing information is based, at least in part, on an urgency or priority associated with at least a portion of the configuration update.

20. The system of claim 17, wherein the timing information is based, at least in part, on an urgency or priority associated with at least a portion of the configuration update.

* * * * *